(12) United States Patent
Kim

(10) Patent No.: US 10,993,214 B2
(45) Date of Patent: Apr. 27, 2021

(54) METHOD FOR PROVIDING CONTROL INFORMATION FOR MUST TRANSMISSION IN WIRELESS COMMUNICATION SYSTEM, AND APPARATUS THEREFOR

(71) Applicant: LG ELECTRONICS INC., Seoul (KR)

(72) Inventor: Hyungtae Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 68 days.

(21) Appl. No.: 16/094,868

(22) PCT Filed: May 15, 2017

(86) PCT No.: PCT/KR2017/005015
§ 371 (c)(1),
(2) Date: Oct. 18, 2018

(87) PCT Pub. No.: WO2017/196155
PCT Pub. Date: Nov. 16, 2017

(65) Prior Publication Data
US 2019/0098610 A1    Mar. 28, 2019

Related U.S. Application Data

(60) Provisional application No. 62/335,713, filed on May 13, 2016, provisional application No. 62/365,351,
(Continued)

(51) Int. Cl.
*H04W 72/04* (2009.01)
*H04J 11/00* (2006.01)
(Continued)

(52) U.S. Cl.
CPC .......... *H04W 72/042* (2013.01); *H04J 11/00* (2013.01); *H04W 72/082* (2013.01); *H04W 88/02* (2013.01); *H04W 88/08* (2013.01)

(58) Field of Classification Search
CPC . H04W 72/042; H04W 72/082; H04W 72/04; H04W 88/08; H04J 11/00
See application file for complete search history.

(56) References Cited

U.S. PATENT DOCUMENTS

2013/0286954 A1* 10/2013 Ma .................. H04B 7/024
370/329
2015/0271830 A1* 9/2015 Shin .................. H04L 1/206
370/329
(Continued)

FOREIGN PATENT DOCUMENTS

KR    1020140108785    9/2014
WO    2013191367    12/2013
(Continued)

OTHER PUBLICATIONS

PCT International Application No. PCT/KR2017/005015, Written Opinion of the International Searching Authority dated Jul. 24, 2017, 18 pages.
(Continued)

*Primary Examiner* — Walter J Divito
*Assistant Examiner* — Anthony Luo
(74) *Attorney, Agent, or Firm* — Lee, Hong, Degerman, Kang & Waimey PC

(57) ABSTRACT

Disclosed is a method for receiving a downlink data signal from an eNode B by a user equipment in a wireless communication system. Specifically, the method comprises the steps of: receiving downlink control information including an interface signal-related field; and receiving the downlink data signal using the downlink control information, wherein the interference signal-related field indicates whether an
(Continued)

interference signal exists, and further indicates a modulation scheme applied to the interference signal when the interference signal exists.

10 Claims, 9 Drawing Sheets

Related U.S. Application Data filed on Jul. 21, 2016, provisional application No. 62/369,762, filed on Aug. 2, 2016, provisional application No. 62/373,968, filed on Aug. 11, 2016, provisional application No. 62/401,869, filed on Sep. 29, 2016, provisional application No. 62/405,255, filed on Oct. 7, 2016, provisional application No. 62/417,342, filed on Nov. 4, 2016.

(51) Int. Cl.
*H04W 72/08* (2009.01)
*H04W 88/02* (2009.01)
*H04W 88/08* (2009.01)

(56) References Cited

U.S. PATENT DOCUMENTS

| | | | |
|---|---|---|---|
| 2015/0312074 A1* | 10/2015 | Zhu | H04L 27/2627 370/329 |
| 2016/0329981 A1* | 11/2016 | Chung | H04W 72/0446 |

FOREIGN PATENT DOCUMENTS

| | | |
|---|---|---|
| WO | 2015167714 | 11/2015 |
| WO | 2016168732 | 10/2016 |
| WO | 2015107771 | 3/2017 |

OTHER PUBLICATIONS

Asustek, "Discussion on Scheduling Information for MUST Receivers", 3GPP TSG RAN WG1 Meeting #82bis, R1-155827, Oct. 2015, 3 pages.

European Patent Office Application Serial No. 17796455.8, Search Report dated Dec. 9, 2019, 10 pages.

* cited by examiner

-- Prior Art --

(a) Control-Plane Protocol Stack (b) User-Plane Protocol Stack

-- Prior Art --

METHOD FOR PROVIDING CONTROL INFORMATION FOR MUST TRANSMISSION IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2017/005015, filed on May 15, 2017, which claims the benefit of U.S. Provisional Application No. 62/335,713, filed on May 13, 2016, 62/365,351, filed on Jul. 21, 2016, 62/369,762, filed on Aug. 2, 2016, 62/373,968, filed on Aug. 11, 2016, 62/401,869, filed on Sep. 29, 2016, 62/405,255, filed on Oct. 7, 2016, and 62/417,342, filed on Nov. 4, 2016, the contents of which are all hereby incorporated by reference herein in their entireties.

TECHNICAL FIELD

The present invention relates to a wireless communication system, and more particularly, to a method and apparatus for providing control information for multi-user superposition transmission (MUST) transmission in a wireless communication system.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz and provide a downlink or uplink transmission service to multiple UEs in the bandwidth. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

INVENTION

Technical Problem

Based on the above description, the present invention is intended to propose a method and apparatus for providing control information for multi-user superposition transmission (MUST) transmission in a wireless communication system.

Technical Solution

In an aspect of the present invention, a method of receiving a downlink data signal from a base station (BS) by a user equipment (UE) in a wireless communication system includes receiving downlink control information including an interference signal-related field, and receiving the downlink data signal by using the downlink control information. The interference signal-related field indicates the presence or absence of an interference signal, and if the interference signal exists, further indicates a modulation scheme applied to the interference signal.

In another aspect of the present invention, a UE in a wireless communication system includes a wireless communication module, and a processor connected to the wireless communication module, and configured to receive downlink control information including an interference signal-related field, and receive a downlink data signal by using the downlink control information. The interference signal-related field indicates the presence or absence of an interference signal, and if the interference signal exists, further indicates a modulation scheme applied to the interference signal.

Preferably, if the interference signal exists, the interference signal-related field may further indicate whether a modulation order of the modulation scheme applied to the interference signal is equal to or larger than a specific value.

Preferably, if the interference signal exists, the interference signal-related field may indicate one of quadrature phase shift keying (QPSK), 16-ary quadrature amplitude modulation (16QAM), and 64-ary quadrature amplitude modulation (64QAM) as the modulation scheme applied to the interference signal.

More specifically, the interference signal-related field may be 2 bits long, one state of the interference signal-related field may indicate the absence of the interference signal, and each of remaining three states of the interference signal-related field may indicate the presence of the interference signal and the modulation scheme applied to the interference signal.

Characteristically, the interference signal may be a downlink data signal for another UE, multiplexed with the downlink data signal. More preferably, the other UE may be a far UE located at a coverage boundary of the BS.

Advantageous Effects

According to the embodiments of the present invention, a base station (BS) can efficiently provide control information for multi-user superposition transmission (MUST) transmission to a user equipment (UE) in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BEST MODE FOR CARRYING OUT THE INVENTION

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present invention, a base station (eNB) may be used as a broad meaning including a remote radio head (RRH), an eNB, a transmission point (TP), a reception point (RP), a relay, etc.

Figure 1:
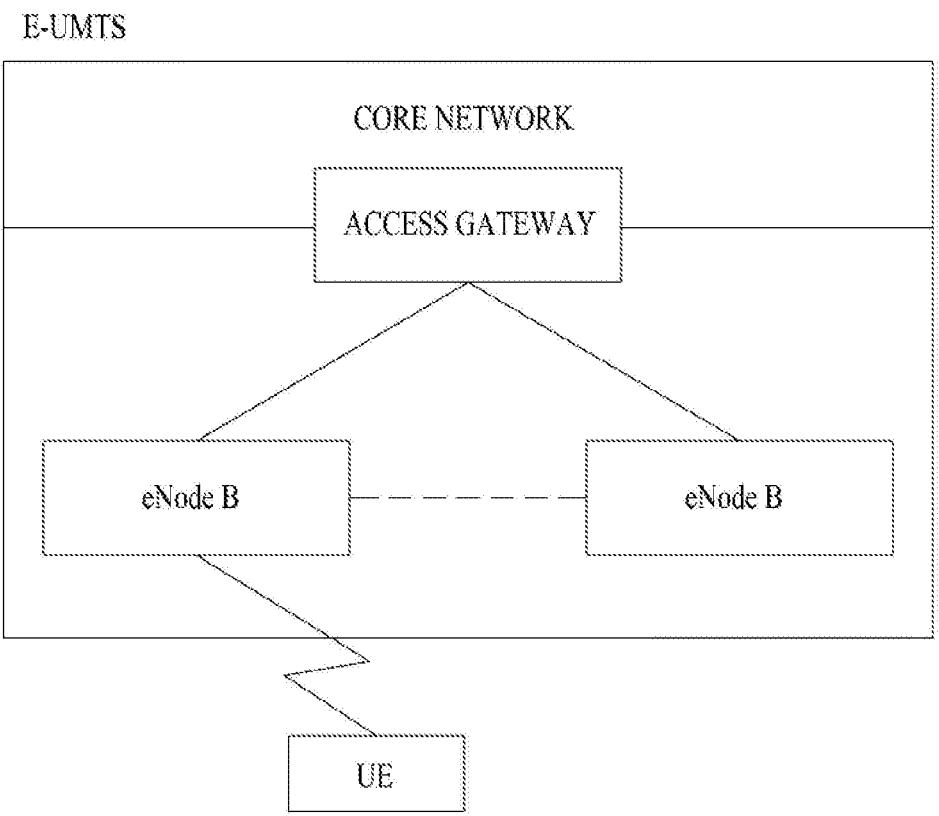
FIG. 1 is a diagram schematically illustrating a network structure of an evolved universal mobile telecommunications system (E-UMTS) as an exemplary radio communication system.
Figure 2:
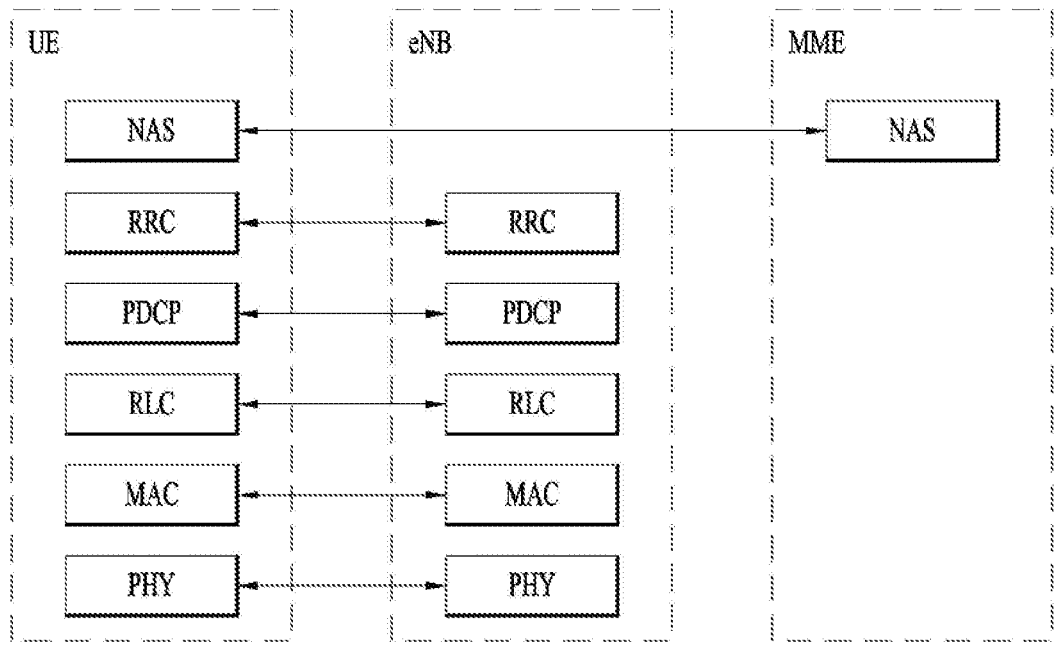
FIG. 2 is a diagram illustrating structures of a control plane and a user plane of a radio interface protocol between a UE and an evolved UMTS terrestrial radio access network (E-UTRAN) based on the 3GPP radio access network specification.
Figure 2:
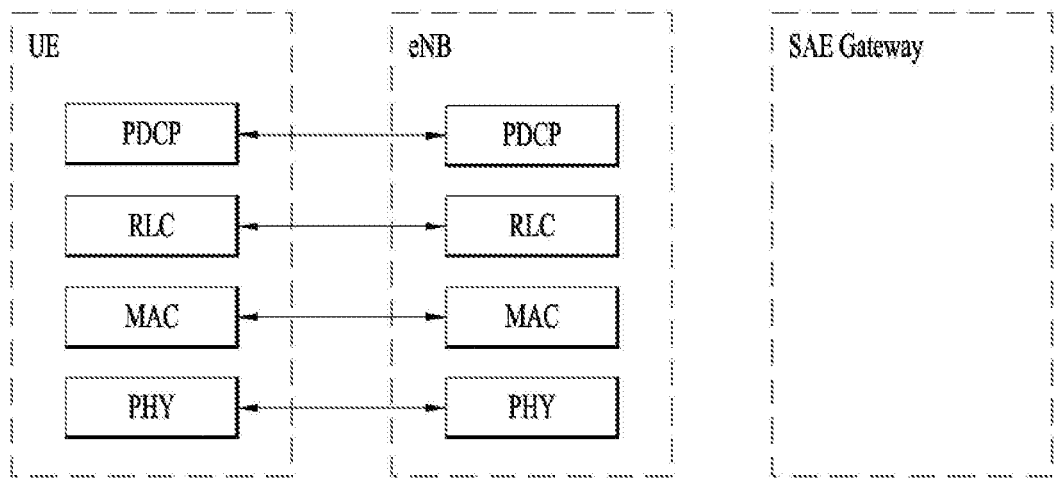

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel Data is transmitted between the MAC layer and the physical layer via the transmission channel Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

One cell managed by an eNB is set to one of the bandwidths of 1.25, 2.5, 5, 10, 15, and 20 MHz, and provides a DL or UL transmission service to a plurality of UEs in the bandwidth. Different cells may be configured to provide different bandwidths.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
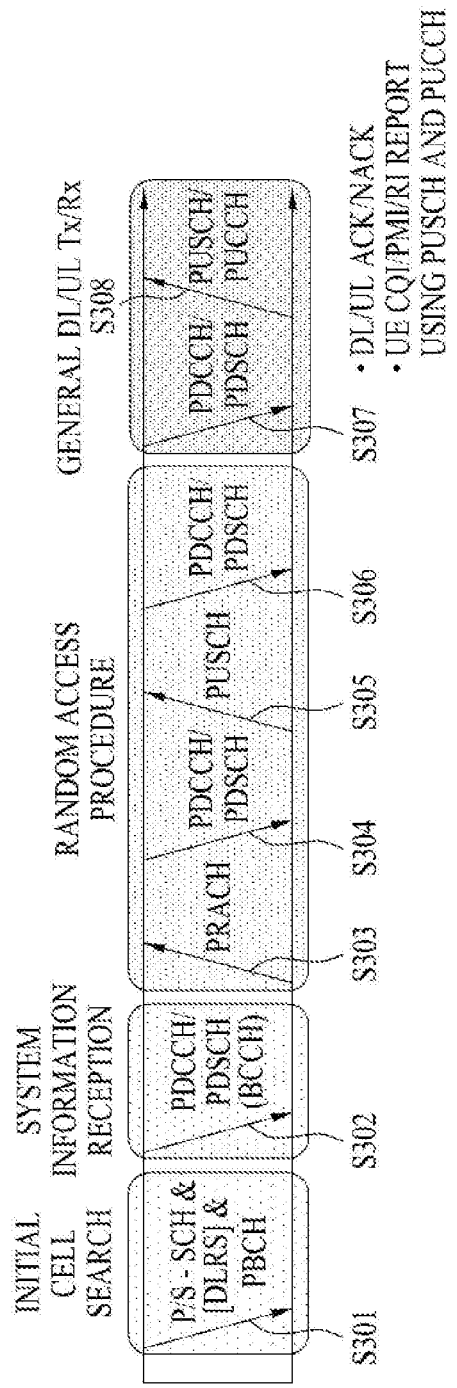
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
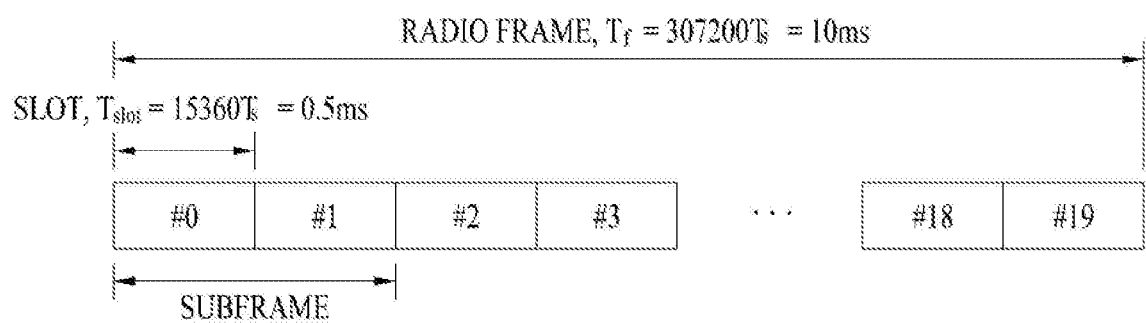
FIG. 4 is a diagram illustrating the structure of a radio frame used in a long term evolution (LTE) system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1415 kHz× 2048)=3.2552×10−8 (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
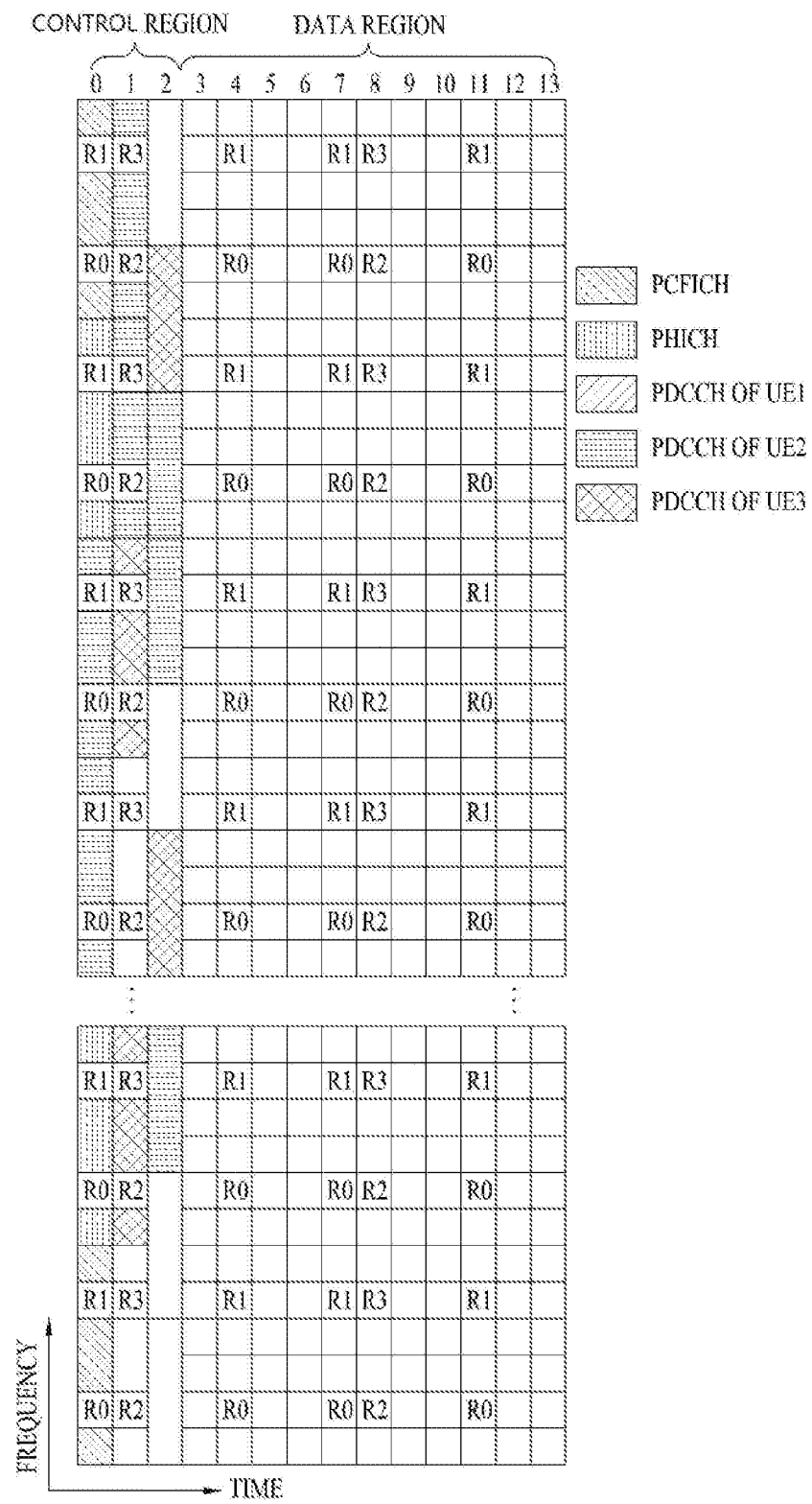
FIG. 5 is a diagram illustrating the structure of a downlink (DL) radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPS K). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
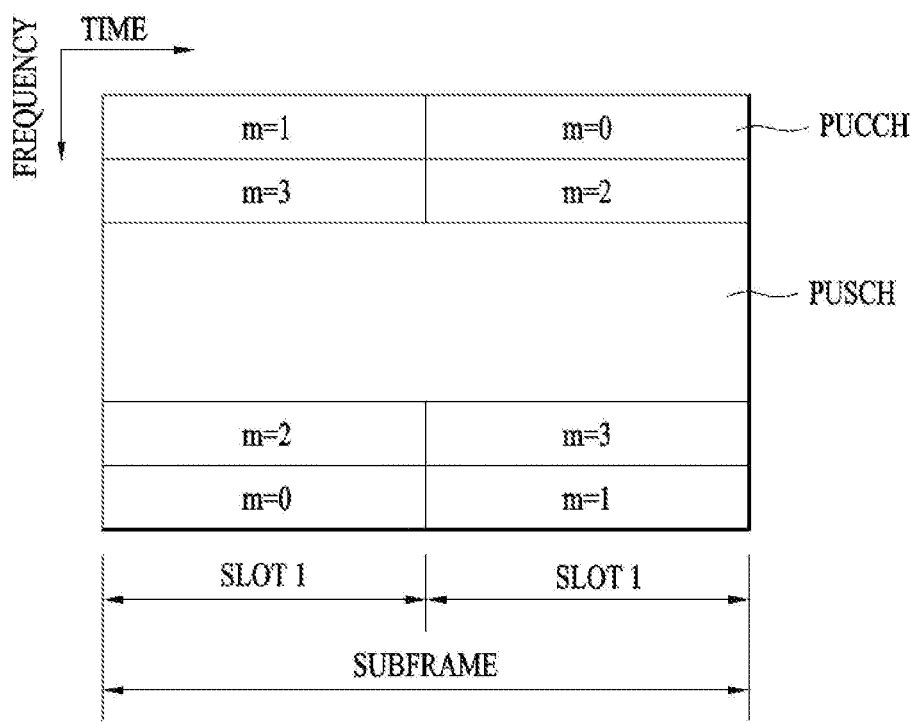
FIG. 6 is a diagram illustrating the structure of an uplink (UL) subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Now, a description will be given of a multiple input multiple output (MIMO) system. MIMO uses a plurality of transmission antennas and a plurality of reception antennas to thereby increase the transmission and reception efficiency of data. That is, with the use of multiple antennas at a transmitter or a receiver, MIMO may increase capacity and improve performance in a wireless communication system. The term, MIMO is interchangeable with 'multi-antenna'.

The MIMO technology does not depend on a single antenna path to receive a whole message. Instead, the message is completed by combining data fragments received through a plurality of antennas. MIMO can increase a data rate within a cell area of a certain size or extend system coverage, while ensuring a specific data rate. Further, this technology may find its use in a wide range including mobile communication terminals, relays, and so on. MIMO can overcome the limited transmission capacity of mobile communication, encountered with the conventional single-antenna technology.

If a transmitter has $N_T$ transmission antennas and a receiver has $N_R$ reception antennas, simultaneous use of a plurality of antennas at both the transmitter and the receiver increases a theoretical channel transmission capacity, compared to use of a plurality of antennas at only one of the transmitter and the receiver. The channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas. $R_i$ is the smaller value between $N_T$ and $N_R$. For example, a MIMO communication system with four transmission antennas and four reception antennas may achieve a four-fold increase in transmission rate theoretically, relative to a single-antenna system.

Since the theoretical capacity increase of the MIMO system was proved in the mid-1990s, many techniques have been actively studied to increase data rate in real implementation. Some of the techniques have already been reflected in various wireless communication standards for 3G mobile communications, future-generation wireless local area network (WLAN), and so on.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, and so on.

If each of different pieces of information transmitted in MIMO is defined as a 'transmission stream' or simply as a 'stream', many methods of mapping one or more streams to a plurality of antennas are available. These methods may be described as follows according to MIMO types. If one stream is transmitted through a plurality of antennas, this may be considered to be spatial diversity, and if a plurality of streams are transmitted through a plurality of antennas, this may be considered to be spatial multiplexing. Obviously, a hybrid form of spatial diversity and spatial multiplexing is also possible.

The present invention provides a method related to signaling and detailed operations required for an interference cancellation receiver in a multi-user superposition transmission (MUST) system. MUST is a multiple access scheme which can achieve high bandwidth efficiency, compared to a legacy OFDMA system that allocates resources in a time-frequency area, by allocating a plurality of UEs to the same time-frequency resources, additionally using a pre-considered power ratio, and reducing inter-user interference through an interference cancellation receiver, basically on the premise that a signal is transmitted to the interference cancellation receiver. MUST is discussed as a promising candidate technique for a future $5^{th}$ generation (5G) system. In other words, in MUST, one spatial layer exists for two co-scheduled UEs, and the one spatial layer may be configured by superposing a plurality of data layers subject to the same precoding vector or the same diversity scheme. The plurality of superposed data layers may be distinguished from each other on the basis of power differences. The co-scheduled two UEs, preferably a near UE may identify its data in the one spatial layer by a power difference.

Key constituent techniques of the MUST system may be divided into eNB resource allocation and UE interference cancellation. Particularly according to the types of interference cancellation schemes of UEs, the UE interference cancellation technique may be broken down into symbol level interference cancellation (SIC) receivers represented by a maximum likelihood (ML) receiver, and codeword level interference cancellation (CWIC) receivers represented by an MMSE-based linear CWIC (L-CWIC) or maximum likelihood-CWIC (ML-CWIC) receiver. A different gain is achieved in a given environment according to each interference cancellation scheme. In general, an ML scheme and a CWIC receiver have large gains in proportion to UE implementation complexity.

In a MUST transmission scheme, DL data for a plurality of UEs are transmitted in the same time and frequency. A near UE which is near to an eNB and thus has a good geometry and a far UE remote from the eNB are paired, and then receive a DL service. A half or more of total power is used for data for the far UE, whereas the remaining partial power is used for data for the near UE.

Although the far UE is interfered from a part of the data for the near UE, the transmission power of the data for the near UE is too weak, compared to the transmission power of the data for the far UE, and the interference becomes weak due to high path loss. Accordingly, the far UE may receive the data without advanced interference cancellation (IC) such as symbol-level interference cancellation (SLIC)/maximum likelihood (ML)/codeword-level interference cancellation (CLIC), or the like. On the other hand, since the near UE is subject to much interference from the far UE, the near UE mitigates the interference by IC such as SLIC/ML/CWIC, and then receives the data.

Figure 7:
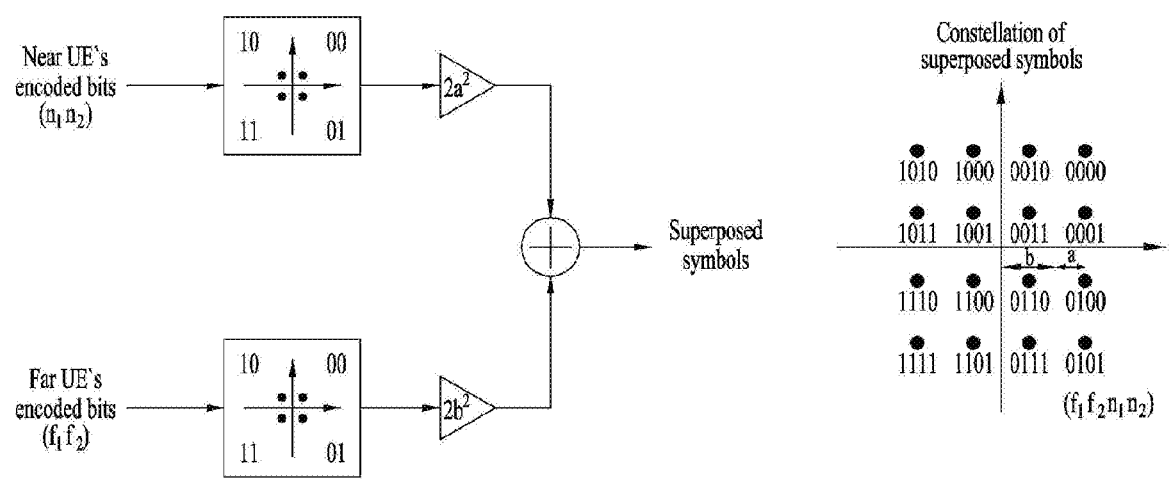
FIG. 7 is a diagram illustrating an exemplary one of transmission schemes in a multi-user superposition transmission (MUST) system.

Various transmission schemes are available in the MUST system. FIG. 7 illustrates an exemplary one of transmission schemes in a MUST system.

Referring to the left drawing of FIG. 7, information bits of data for a near UE and information bits of data for a far UE are converted to coded bits by respective channel codings. Subsequently, constellation symbols for the near UE and the far UE are generated respectively by processing the coded bits of the UEs in a modulator. Then, after power is appropriately allocated to each constellation symbol, the two constellation symbols are combined into one superposed symbol.

For example, if the coded bits of the near UE and the coded bits of the far UE are 00 and 11, respectively, a constellation symbol for each of the UEs is generated in quadrature phase shift keying (QPSK), and power is allocated to the constellation symbol. Subsequently, one superposed symbol is generated by combining the two QPSK symbols. Examples of the single superposed symbol generated in this manner are illustrated in the right drawing of FIG. 7. The superposed symbol is processed by layer mapping and precoding, and transmitted through an eNB antenna.

Meanwhile, the recent 3GPP standard defines the categories of MUST transmission schemes as listed in Table 1 below.

TABLE 1

| Category 1 | Superposition transmission with adaptive power ratio on component constellations and non-Gray-mapped composite constellation |
| Category 2 | Superposition transmission with adaptive power ratio on component constellations and Gray-mapped composite constellation |
| Category 3 | Superposition transmission with label-bit assignment on composite constellation and Gray-mapped composite constellation |

It has been discussed in the recent LTE standardization that predetermined assistance information is provided to a UE that receives data by MUST transmission (hereinafter, referred to as a MUST UE which may be a high-geometry UE or a low-geometry UE) in order to allow the MUST UE to efficiently cancel interference from another UE for which data is transmitted superposed with data for the MUST UE (i.e., a MUST-paired UE). Exemplary assistance information is described in Table 2 below.

TABLE 2

The following should be considered as potential PDSCH assistance information for MUST Category 1, 2, and 3 UE.
    For MUST Category 1, 2, and 3
      (R-)ML/SLIC (available receiver type for far UE or near UE)
        Existence/processing of MUST interference (per spatial layer if same beam restriction is applied)
        Modulation order of MUST paired UE
        Transmission power allocation of its PDSCH and MUST paired UE's PDSCH (per spatial layer if different power can be allocated to each spatial layer)
        Resource allocation of MUST paired UE
        PDSCH RE mapping information of MUST paired UE (if it is different, from its own PDSCH RE mapping information, e.g. PDSCH starting symbol or PDSCH RE mapping at DMRS RE)
        DMRS information of MUST paired UE (if DMRS information is used to estimate effective channel of MUST paired UE or to derive power allocation of MUST paired UE)
        Transmission scheme of MUST paired UE (if mixed transmission schemes, e.g. transmit diversity and closed-loop spatial multiplexing)
        Precoding vector(s) of MUST paired UE
      CWIC (available receiver type for near UE)
        The above potential assistance information for ML receiver
        TBS of MUST paired UE
        HARQ information of MUST paired UE
        LBRM (Limited Buffer Rate Matching) assumption of MUST paired UE
        Parameters for descrambling and CRC checking for the PDSCH of the MUST paired user
      MMSE-IRC (available receiver type for far UE)
        Transmission power allocation of its PDSCH and MUST paired UE's PDSCH
    Additionally, the followings should be considered potential assistance information for Category 3.
      For MMSE IRC, SLIC, (R-)ML, and CWIC
        Modulation order of composite constellation
        Bit allocation information of composite constellation It is proposed that to indicate the various pieces of assistance information to a UE, an eNB transmits DCI by using specific cyclic redundancy (CRC) masking, and the UE performs a CRC check by the CRC masking. In the current LTE system, the CRC bits of DCI are generated and masked by UE_ID assigned to a UE by an eNB, and the masked CRC is transmitted in a CRC field of the DCI. Since the UE is aware of its UE_ID, the UE performs a CRC check by using UE_ID and the received DCI.

In the present disclosure, it is proposed that assistance information is indicated by performing CRC masking by any number or identifier (ID) (referred to as a VID) other than UE_ID.

For example, in the case where an eNB indicates the presence or absence of MUST interference to a UE, if the CRC of DCI is masked by UE_ID, this may indicate the presence of MUST interference, and if the CRC is masked by a VID, this may indicate the absence of MUST interference.

Figure 8:
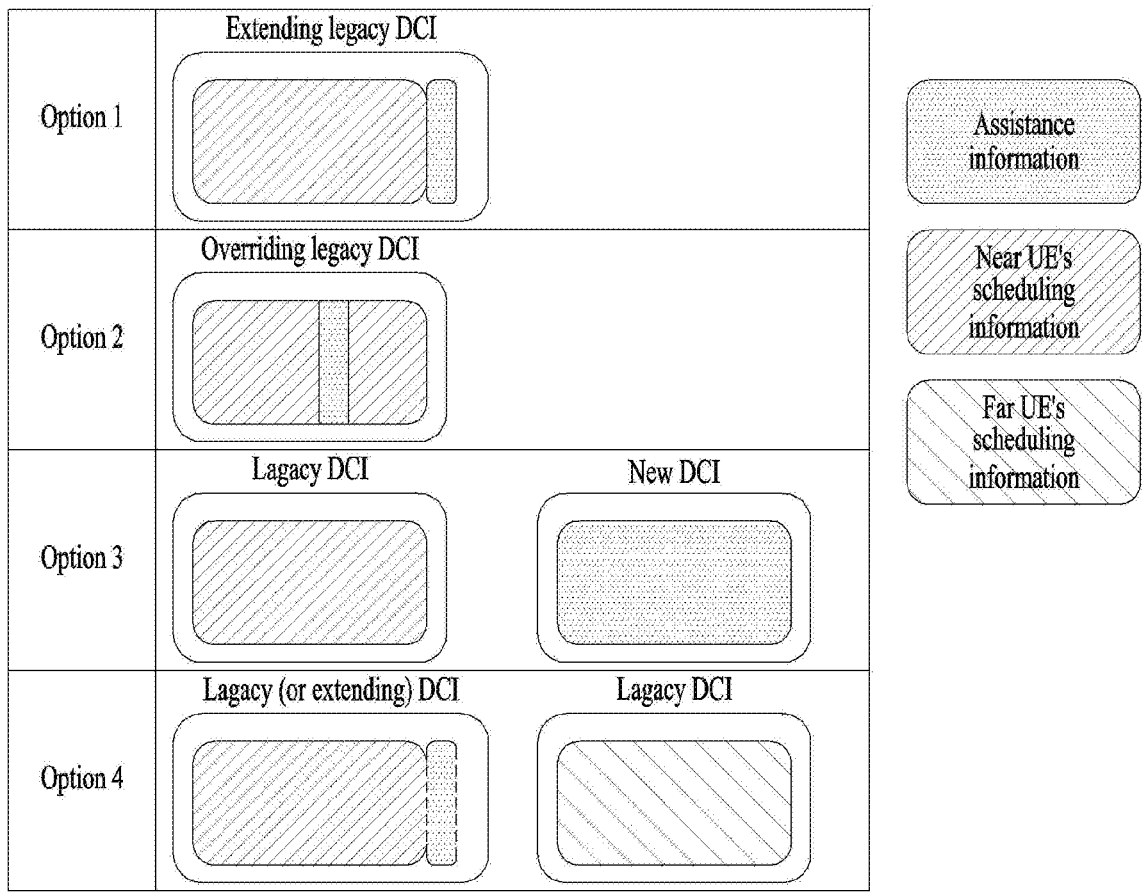
FIG. 8 is a diagram illustrating various options to indicate the presence or absence of MUST interference according to an embodiment of the present invention.

FIG. 8 illustrates various exemplary options to indicate the presence or absence of MUST interference according to an embodiment of the present invention. With reference to FIG. 8, a specific UE operation in each option will be described below.

—Option 1

In Option 1, in the case where the presence or absence of MUST interference is indicated by CRC masking in the foregoing manner, if DCI is masked by UE_ID, this means the presence of MUST interference, and thus the UE cancels interference from another UE by using an additional assistance information field in the DCI. On the contrary, if the DCI is masked by the VID, this means the absence of MUST interference, and thus the UE ignores the additional assistance information field in the DCI, considering that the additional assistance information field is dummy bits.

—Option 2

In Option 2, in the case where the presence or absence of MUST interference is indicated by CRC masking in the foregoing manner, if DCI is masked by UE_ID, this means the presence of MUST interference, and thus the UE cancels interference from another UE by using an additional assistance information field in the DCI, determining that some field of the DCI has been overridden for delivery of the assistance information field. On the contrary, if the DCI is masked by the VID, this means the absence of MUST interference, and thus the UE acquires scheduling information for its desired data, assuming the DCI to be legacy DCI in which some field of the DCI is not overridden for delivery of an assistance information field.

—Option 3

In Option 3, in the case where the presence or absence of MUST interference is indicated by CRC masking in the foregoing manner, if DCI is masked by UE_ID, this means the presence of MUST interference, and thus the UE cancels interference from another UE by blind-detecting new DCI including assistance information, other than legacy DCI, and using the assistance information. On the contrary, if the DCI is masked by the VID, this means the absence of MUST interference, and thus the UE does not attempt blind detection of the new DCI including the assistance information.

—Option 4

In Option 4, in the case where the presence or absence of MUST interference is indicated by CRC masking in the foregoing manner, if DCI is masked by UE_ID, this means the presence of MUST interference, and thus the UE cancels interference from another UE by blind-detecting DCI of the other UE including assistance information, other than legacy DCI, and using the assistance information. On the contrary, if the DCI is masked by the VID, this means the absence of MUST interference, and thus the UE does not attempt blind detection of the DCI of the other UE including the assistance information.

Even when the presence or absence of MUST interference is explicitly signaled by a specific field in DCI or the UE blind-detects the presence or absence of MUST interference, how a UE should interpret DCI according to the presence or absence of MUST interference in each option, whether the UE should attempt blind detection of individual DCI including assistance information, and so on may be determined as described above.

Meanwhile, if legacy DCI for the UE is extended by adding assistance information to the legacy DCI in Option 1 and Option 4 (i.e., a field carrying assistance information is added at the end of the legacy DCI), the corresponding information is filled with dummy data in the absence of MUST interference. In order to increase the reliability of DCI decoding, the dummy data is set to a specific value preset between the eNB and the UE, for example, filled with zero padding.

Besides indication of the presence or absence of MUST interference, CRC masking may be used to indicate many other pieces of assistance information. For example, the eNB and the UE have knowledge of UE_ID, VID1, VID2, . . . , $VID_N$ (the VIDs are defined UE-specifically, and a VID should be defined to be specific to each UE to prevent any other UE from succeeding in blind-detection of DCI which is not related to the other UE), and each CRC masking candidate, that is, UE_ID, VID1, VID2, . . . , $VID_N$ may represent specific assistance information. For example, UE_ID, VID1, VID2, . . . , $VID_N$ may be mapped to different power allocation ratio information in a one-to-one correspondence. Or UE_ID, VID1, VID2, . . . , $VID_N$ may be mapped to demodulation reference signal (DM-RS) information (VCID, nSCID, a DM-RS port, the number of layers, or the like) or modulation order information about different MUST-paired UEs in a one-to-one correspondence. Although the mapping relationship may be defined fixedly, the mapping relationship may be indicated to the UE by RRC signaling by the eNB.

The VID may be indicated UE-specifically to the UE by RRC signaling by the eNB. Or the VID may be generated and used by using a method or function preset between the eNB and the UE on the basis of UE_ID. For example, the VID may be defined by adding an offset to UE_ID on the basis of a predetermined offset value or performing a bit operation, for example, exclusive OR(XOR) between UE_ID and the offset. Or the VID may be generated and used by using UE_ID as a factor of a specific function.

Pursuant to discussion in the recent 3GPP standardization, MUST transmissions are classified into three cases in total, as illustrated in Table 3 below.

TABLE 3

| | |
|---|---|
| Case 1 | Superposed PDSCHs are transmitted using the same transmission scheme and the same spatial precoding vector |
| Case 2 | Superposed PDSCHs are transmitted using the same transmit diversity scheme |
| Case 3 | Superposed PDSCHs are transmitted using the same transmission scheme, but their spatial precoding vectors are different |

Different assistance information may be required in each case. As a result, the signaling payload size and blind detection computation volume of the assistance information may vary. For example, compared to Case 1, Case 3 requires precoding information (e.g., RI or PMI) about an interfering UE, and modulation order information about the interfering UE.

Accordingly, a MUST case should be signaled to the UE, or the UE should be able to blind-detect the MUST case, during MUST transmission. For example, the MUST case may be indicated by the proposed CRC masking. If a transmission scheme used for desired data of the UE is transmit diversity (TxD), this automatically corresponds to Case 2, thereby obviating the need for additional signaling to indicate Case 2. Regarding the other transmission schemes, however, one of Case 1 and Case 3 may be applicable dynamically as is the case with applying Case 1 in subframe #N and Case 3 in subframe #N+1. Therefore, which one between the two cases may be indicated by assistance information.

If Case 1 and Case 3 require different payload sizes of assistance information, the number of DCI blind detections may be increased at the UE, thus increasing the complexity of the UE. For example, the assistance information field may be defined to be 4 bits and 3 bits in total, respectively for Case 1 and Case 3 in Option 1. In this case, Case 1 and Case 3 differ in the total DCI payload size, and thus the UE should perform DCI blind detection for assumed Case 1 and Case 3, respectively. Accordingly, to prevent an increase in the number of DCI blind detections, there is a need for fixing the size of DCI including MUST assistance information irrespective of the cases.

For example, the assistance information payload size may be fixed to the assistance information payload size of Case 1 larger than that of Case 3, and in Case 3, the remaining unnecessary assistance information field may carry dummy data. Herein, the eNB and the UE may agree that the dummy data is always all zeroes, to increase a channel coding gain and thus improve transmission reliability.

Or the eNB may semi-statically configure the UE to selectively apply Case 1 or Case 3 by higher-layer signaling. Further, case information may be transmitted along with information indicating the presence of MUST interference. That is, the presence of MUST interference is defined separately for Case 1 and Case 3, and the eNB indicates the presence of MUST interference separately for Case 1 and Case 3 to the UE. In the presence of MUST interference for Case 1, the UE interprets the remaining assistance information field as a necessary information field in Case 1, and in the presence of MUST interference for Case 3, the UE interprets the remaining assistance information field as a necessary information field in Case 3.

It has been considered in the above to apply only one of Case 1 and Case 3 at one instant, instead of applying Case 1 and Case 3 simultaneously in the same subframe. If Case 1 and Case 3 are applicable simultaneously in the same subframe, both the assistance information field for Case 1 and the assistance information field for Case 3 should exist in DCI. For example, the union of the following pieces of assistance information a) and b) should be included in DCI.

a) {existence of Case 1 MUST interference, power information of Case 1 MUST interference} for Case 1 b) {existence of Case 3 MUST interference, power information of Case 3 MUST interference, PMI, modulation order} for Case 3

If Case 1 MUST interference exists, assistance information fields for Case 1 are interpreted as valid, and otherwise, the assistance information fields for Case 1 are interpreted as invalid and thus a dummy signal. The same method applies to Case 3.

As the UE blind-detects partial information of assistance information sets for Case 1 and Case 3, there may be no need for signaling the partial information. Further, if each piece of assistance information is signaled not just as a single value but as a plurality of values, the UE may perform blind detection within the plurality of values.

After the UE blind-detects Case 1 and Case 3 or receives signaling indicating Case 1 and Case 3, the UE interprets the remaining assistance information differently or deals with a different blind detection target, according to the blind detection or signaling.

For example, a field of DCI is interpreted differently according to Case 1 and Case 3 during 2Tx cell-specific reference signal (CRS)-based closed loop MIMO transmission as in TM4 of the LTE system, as follows. For Case 1, information indicating the presence or absence of MUST interference is defined to be 1 bit for each of first and second layers, and power allocation information is defined to be 2 bits. Thus, a 4-bit assistance information field is defined. On the other hand, for Case 3, a 4-bit assistance information field with 1 bit indicating an RI, 2 bits indicating a PMI, and 1 bit indicating a modulation order is defined. Herein, while there are three interference modulation schemes, QPSK, 16-ary quadrature amplitude modulation (16QAM), and 64-ary quadrature amplitude modulation (64QAM), signaling is limited to QPSK and 16QAM in order to maintain a payload size. If an actual interference modulation scheme is 64QAM, (R-)ML reception of the UE on the assumption of 64QAM interference offers the best decoding performance Nonetheless, it is expected that assumption of 16QAM interference will not cause much performance degradation, and thus signaling is performed in 16QAM instead of 64QAM. For this reason, instead of 2-bit signaling of a modulation order, 1-bit signaling of a modulation order by limiting the modulation scheme to QPSK and 16QAM is helpful in terms of control signal conservation.

Further, referring to the 2Tx codebook illustrated in Table 4 below, if (interference) RI=1 in Case 3, a total of three (interference) PMIs are selectable in the 2Tx codebook, and thus one state of a 2-bit PMI field remains. If RI=2, only one (interference) PMI is selectable, and thus three states remain. Other assistance information may be delivered, for example, the absence of interference may be indicated, by these remaining states.

TABLE 4

| Codebook index | Number of layers $\upsilon$ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{\sqrt{2}}\begin{bmatrix}1 & 0\\1 & -1\end{bmatrix}$ |
| 2 | $\frac{1}{\sqrt{2}}\begin{bmatrix}1\\j\end{bmatrix}$ | $\frac{1}{\sqrt{2}}\begin{bmatrix}1 & 0\\j & -j\end{bmatrix}$ |
| 3 | $\frac{1}{\sqrt{2}}\begin{bmatrix}1\\-j\end{bmatrix}$ | — |

Or for Case 3, the assistance information field may be defined by 1 bit indicating the presence or absence of interference, 2 bits indicating an RI and a PMI in combination, and 1 bit indicating a modulation order. For example, in 2Tx CRS-based closed loop MIMO transmission, RI-PMI combinations of two UEs corresponding to Case 3 are given as follows. Particularly, although the rank and PMI of an interfering UE are signaled simultaneously, the signaling is based on the assumption that an interference-canceling UE and the interfering UE receive data by different beams.

If the rank of the interference-canceling UE is 1 and the rank of the interfering UE is 1, the PMI of the interference-canceling UE is indicated by DCI, and the PMI of the interfering UE is one of the remaining PMIs except for the PMI of the interference-canceling UE. These remaining PMIs are defined as state 0, state 1, and state 2.

If the rank of the interference-canceling UE is 1 and the rank of the interfering UE is 2, the PMI of the interference-canceling UE is indicated by DCI, and the PMI of the interfering UE is only a rank-2 PMI except for the PMI of the interference-canceling UE. This PMI is defined as state 3.

If the rank of the interference-canceling UE is 2 and the rank of the interfering UE is 1, the PMI of the interference-canceling UE is indicated by DCI, and the PMI of the interfering UE is one of the remaining two PMIs except two vectors of the PMI of the interference-canceling UE. These PMIs are defined as state 4 and state 5.

If the rank of the interference-canceling UE is 2 and the rank of the interfering UE is 2, the PMI of the interference-canceling UE is indicated by DCI, and the PMI of the interfering UE is only a rank-2 PMI except for the PMI of the interference-canceling UE. This PMI is defined as state 6.

With the above combinations considered, if the rank of the interference-canceling UE is 1, the ranks and PMIs of the interfering UE may be defined as four states, and if the rank of the interference-canceling UE is 2, the ranks and PMIs of the interfering UE may be defined as three states. Therefore, it is more preferable, in terms of control channel conservation, to define 2 bits for an RI and a PMI by joint encoding, and interpret the joint-encoded 2 bits differently according to the rank and PMI of the interference-canceling UE than to define 1 bit and 2 bits for an RI and a PMI, separately. That is, if the rank of the interference-canceling UE is 1, the 2 bits are interpreted as state 0 to state 3, and if the rank of the interference-canceling UE is 2, the 2 bits are defined as state 4 to state 6.

To reduce the signaling overhead of assistance information, only one of an interference RI and PMI may be signaled. For example, the interference RI is signaled, and the PMI is blind-detected by the UE.

Hereinbelow, signaling of assistance information to a far UE will be described.

In general, the presence of MUST interference is indicated to a near UE between MUST-paired UEs, and the absence of MUST interference is indicated to a far UE. The far UE operates in the same manner as in a reception operation during non-MUST transmission, treating an assistance information field as dummy data.

However, the transmission of dummy data leads to resource waste. To prevent the resource waste, partial assistance information may be delivered additionally to the far UE in order to cancel interference from the near UE. For this purpose, the eNB should first indicate to a UE whether the UE is scheduled as a far UE or scheduled in a legacy MIMO transmission scheme.

For example, the absence of MUST interference is indicated to the UE. In addition, it is signaled to the UE whether the UE is scheduled as a far UE or scheduled in the legacy MIMO transmission scheme. If the UE is a far UE, the UE receives additional assistance information in the assistance information field, and uses the additional assistance information, to cancel interference from the near UE. For example, the UE receives power allocation ratio information, and uses the received power allocation ratio information in minimum mean square error-interference rejection combining (MMSE-IRC) reception beamforming.

Meanwhile, in the case of the legacy MIMO transmission scheme, the UE treats the assistance information field as dummy data. It may be indicated whether the UE is a far UE by legacy MIMO transmission power allocation ratio information. That is, the absence of MUST interference is signaled to the UE, and one of 0, 0.1, and 0.2 is further signaled as power allocation ratio information to the UE. If the value is 0, this implies that the power of the near UE is 0, and thus the UE is scheduled in the legacy MIMO transmission scheme. If the value is 0.1 (or 0.2), this implies that the UE is a far UE, and the UE cancels interference from the near UE, assuming that the power of the near UE is 0.1 (or 0.2) of total reception power.

Now, a detailed description will be given of UE capability information included in assistance information.

A UE using an ML receiver configures a composite constellation by using (i.e., superposing) its desired symbol and an interference symbol, and then decodes the composite constellation by comparing the composite constellation with a received signal. As more symbols constitute the constellation symbol, the decoding becomes more complex, and as the number of superposed layers and a modulation order for each layer increase, the number of symbols constituting the constellation symbol also increases. Therefore, as an interference modulation order is smaller, more interference layers may be ML-decoded. For example, if interference is modulated in 64QAM, ML decoding is possible for up to one interference layer, whereas if interference is modulated in QPSK, ML decoding is possible for up to two interference layers.

Therefore, when reporting its MUST interference cancellation capability, a MUST UE preferably reports a different number of interference layers that can be cancelled according to the modulation order of interference (or the MUST UE may report a different sum of the number of its layers and the number of interference layers to be cancelled, according to the modulation order of the interference).

Further, the UE may report that the UE is capable of performing MUST only for a specific one of Case 1, Case 2, and Case 3. As a result, the MUST UE may be implemented with UE complexity at various levels, thereby ensuring the flexibility of UE implementation. For example, if a UE reports that MUST is possible only in Case 1, the implementation complexity is low, whereas the implementation complexity of a UE capable of supporting all of Case 1, Case 2, and Case 3 is high.

Further, the UE may report whether the UE is capable of cancelling MUST interference in Case 1 and Case 2 only when the UE is a near UE, or irrespective of whether the UE is a near/far UE. If the latter UE is scheduled as a far UE, the eNB may transmit to the UE additional assistance information for canceling interference from a near UE.

Meanwhile, a UE supporting Case 3 may include and report a blind detection capability for an interference DM-RS port in capability information. The MUST UE reports to the eNB whether the MUST UE is capable of blind detection for all of interference DM-RS ports 7, 8, 11, and 13 or only for DM-RS ports 7 and 8. In the former case, as the number of DM-RS ports to be blind-detected increases, higher complexity is required. However, since the eNB may allocate DM-RS ports 11 and 13 as well as DM-RS ports 7 and 8 as DM-RS ports of an interfering UE in this case, scheduling freedom may increase.

Further, the burden of UE implementation may be mitigated by defining the capability of supporting blind detection for DM-RS ports 11 and 13, aside from basic DM-RS ports 7 and 8, as an optional feature. Similarly, the burden of UE implementation may be mitigated by defining the capability of supporting MUST for Case 3, aside from Case 1 and Case 2, as an optional feature.

Meanwhile, it may be indicated to a UE whether the UE is a near or far UE, or a legacy MIMO UE (i.e., a non-MUST UE) by a power allocation value without additional signaling. For example, if a signaled or blind-detected power allocation value is 0.9 or 0.8, the UE identifies itself as a far UE. If the UE identifies itself as a far UE, the UE performs demodulation and decoding in the same manner as in legacy MIMO, or attempts to cancel interference from a near UE by using data power information about the near UE. On the other hand, if the power allocation ratio is 0.2, the UE identifies itself as a near UE, and cancels interference from a far UE by operating in ML. If the power allocation ratio is 0, the UE identifies itself as a MIMO UE, and performs demodulation and decoding accordingly.

Pursuant to the current 3GPP standardization, a far UE is limited to QPSK for modulation, and data is loaded on a phase in QPSK. Therefore, the far UE does not demodulate data by directly using data power. That is, the data power may be set randomly irrespective of PA and PB values. However, according to the current 3GPP standardization, if the rank of a UE is 2 or higher in spite of reception of QPSK data, data power should still be configured according to PA and PB values. That is, the data power is set to a power value scaled by using PA and PB, with respect to reception CRS power.

Accordingly, in order not to affect the data power of a (legacy) far UE during MUST transmission, the data power of the far UE and the data power of the near UE should be determined in the following manner.

Data power of far UE=$P_{A\_farUE}*P_{CRS}$

Data power of near UE=alpha*$P_{A\_farUE}*P_{CRS}$

To calculate the data power of the far UE, the near UE should know $P_{A\_farUE}$ and alpha. Alpha is a power allocation ratio, which the eNB may indicate to the UE or the UE may determine by blind detection. $P_A$ is a different value indicated to each UE by RRC signaling. If a different far UE is paired, $P_A$ may be changed, and the paired far UE may be changed dynamically on a subframe-by-subframe basis. For this purpose, the eNB may indicate $P_{A\_farUE}$ to the near UE by DCI, but with large signaling overhead. Therefore, the eNB may primarily indicate a set of $P_{A\_farUE}$ values to the UE by higher-layer signaling such as RRC signaling or the like, and indicate a PA value used in the specific set by DCI. Or the near UE may assume that a PA value configured for the near UE is equal to $P_{A\_farUE}$, without additional signaling, and the eNB may ensure this condition during scheduling.

For a UE supporting MUST transmission other than a legacy UE, it may be limited that if the UE receives QPSK data, data power is not set by applying PA/PB even though a rank of 2 or larger is set.

Meanwhile, according to the current 3GPP standardization, a UE assumes that indicated interference exists uniformly across RBs scheduled for the UE. When the eNB transmits MUST interference information to the UE in DCI, indication of the MUST interference information on an RB basis is preferable in terms of scheduling freedom, but increases DCI overhead.

Accordingly, the present invention proposes that interference information is indicated on a larger unit basis, that is, on a subband basis. Or the eNB may indicate a resource unit on the basis of which interference information is indicated (i.e., on an RB basis, on a subband basis, on a total bandwidth basis, or the like), and transmit interference information to the UE by DCI on the indicated unit basis. Hence, the eNB may determine a resource unit for interference information in consideration of the trade-off between DCI overhead and scheduling freedom, and indicate the determined resource unit to the UE.

Figure 9:
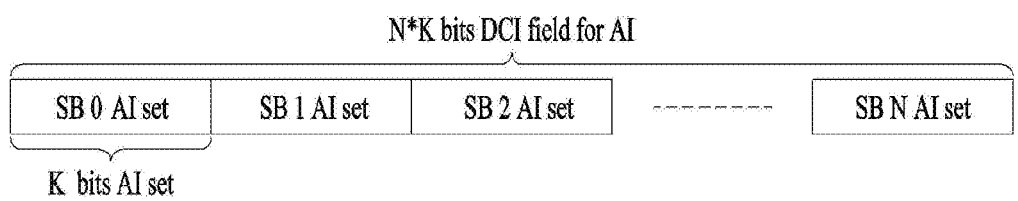
FIG. 9 is a diagram illustrating an exemplary structure of a downlink control information (DCI) field according to an embodiment of the present invention.

For example, if interference information is signaled on a subband basis by DCI, a DCI field may be configured as illustrated in FIG. 9.

Referring to FIG. 9, an NK-bit DCI field is applicable to all of Option 1 to Option 4. In Option 1, new DCI added with the NK-bit DCI field is generated by extending legacy DCI, whereas in Option 3, NK-bit DCI is defined separately as stand-alone DCI.

If data for a UE and an interference PDSCH are transmitted through a DM-RS port, the UE may determine the presence or absence of interference, and an interference channel by blind-detection of an interference DM-RS port and a sequence. Herein, if DM-RS bundling is ON for the UE, the UE blind-detects scheduling information for the interference PDSCH (i.e., an interference modulation order, an interference DM-RS port, a DM-RS sequence, and so on) on a bundle basis, assuming that the interference PDSCH is bundled in the same RB unit basis as for the DM-RS bundling of the UE. Or the eNB may indicate interference DM-RS bundling or non-bundling, and an RB unit for the DM-RS bundling to the UE. Or the eNB may signal to the UE whether it can be assumed that the interference PDSCH is bundled on the same RB unit basis as for DM-RS bundling of the UE.

Meanwhile, in Case 3, the MUST UE needs to know the modulation order of interference data. Since interference data may be changed ideally on an RB basis, it is necessary to know per-RB modulation orders, which increases signaling overhead. Or the signaling overhead may be reduced by always limiting RBs having interference data to the same modulation order (i.e., a single modulation order) from among all RBs carrying data for the MUST UE (i.e., RBs scheduled for the MUST UE). Therefore, the interference modulation order is signaled as one value, not on an RB basis, and the UE assumes that interference data is transmitted with the signaled modulation order in all RBs scheduled for the UE.

Or in the case where the MUST UE is capable of determining the presence or absence of interference in each RB, the UE assumes that the interference data is transmitted with the signaled modulation order in all RBs having interference. Although this method may reduce signaling overhead, it imposes a scheduling limitation on interference data.

Hereinbelow, the present invention proposes that an interference modulation order is signaled as one value or detected through blind detection by a MUST UE, according to a modulation order of the MUST UE.

If the MUST UE has a low modulation order such as QPSK (as a modulation order for its PDSCH), there are only four constellation points for the MUST UE. Thus, the MUST UE may blind-detect an interference modulation order with relatively high accuracy. On the other hand, if the MUST UE uses 64QAM, the blind detection accuracy decreases significantly. Therefore, if the modulation order of the MUST UE is equal to or lower than a specific modulation order, the UE preferably blind-detects the interference modulation order without signaling. If the modulation order of the MUST UE is equal to or higher than the specific modulation order, the interference modulation order is preferably signaled to the UE. One thing to note herein is that it is preferred to indicate only one modulation order in consideration of overhead. The specific modulation order may be QPSK or 16QAM.

If the DCI format and payload size of DCI carrying assistance information are changed according to the modulation order of the MUST UE in the above proposal, the number of DCI blind detections increases. To prevent the increase of the number of DCI blind detections, a field carrying the modulation order of interference should always exist in DCI carrying assistance information. If the modulation order of the UE is equal to or lower than a specific modulation order, the UE does not use the field, interpreting the field as a dummy signal. If the modulation order of the UE is equal to or higher than the specific modulation order, the UE interprets the field and assumes the interpreted value as a single modulation order for interference data. Or if the modulation order of the MUST UE is equal to or lower than the specific modulation order, the MUST UE may reuse the field for the usage of delivering other assistance information.

Meanwhile, regarding the afore-described Case 3, the MUST UE needs to know the modulation order of interference data in Case 3. Therefore, for this purpose, the eNB may provide modulation order information about interference data, for example, a PDSCH for a far UE in DCI by RRC signaling or the like.

More preferably, information indicating the presence or absence of MUST interference and information indicating the modulation order of the MUST interference in the presence of the MUST interference may be joint-encoded and provided in order to reduce signaling overhead. An example of the joint-encoded information is given in Table 5 below.

TABLE 5

| 00 | no MUST interference |
|----|----------------------|
| 01 | QPSK                 |
| 10 | 16QAM                |
| 11 | 64QAM or 256QAM      |

Specifically, the eNB may indicate one of the states listed in Table 5 to the MUST UE by a 2-bit field in DCI format 2B/2C/2D. Upon receipt of the above information, the MUST UE may determine the presence or absence of MUST interference, and if MUST interference exists, determine the modulation order of the corresponding signal. Thus, the above information may be useful for interference cancellation.

Figure 10:
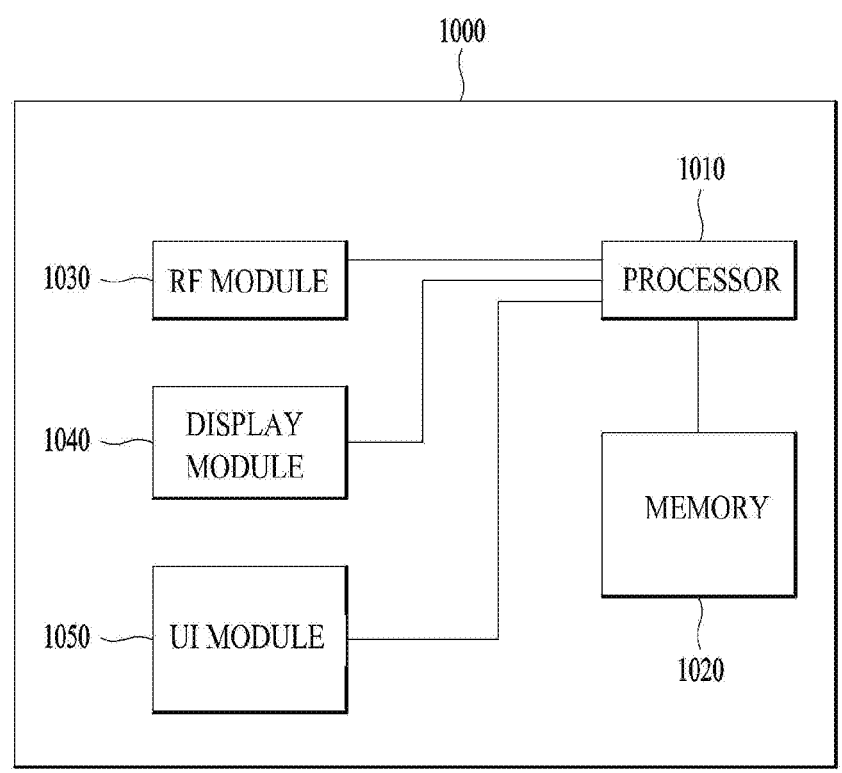
FIG. 10 is a block diagram of a communication apparatus according to an embodiment of the present invention.

FIG. 10 is a block diagram of a communication apparatus according to an embodiment of the present invention.

Referring to FIG. 10, a communication apparatus 1000 includes a processor 1010, a memory 1020, an RF module 1030, a display module 1040, and a user interface (UI) module 1050.

The communication device 1000 is shown as having the configuration illustrated in FIG. 10, for the convenience of description. Some modules may be added to or omitted from the communication apparatus 1000. In addition, a module of the communication apparatus 1000 may be divided into more modules. The processor 1010 is configured to perform operations according to the embodiments of the present invention described before with reference to the drawings. Specifically, for detailed operations of the processor 1010, the descriptions of FIGS. 1 to 9 may be referred to.

The memory 1020 is connected to the processor 1010 and stores an Operating System (OS), applications, program codes, data, etc. The RF module 1030, which is connected to the processor 1010, upconverts a baseband signal to an RF signal or downconverts an RF signal to a baseband signal. For this purpose, the RF module 1030 performs digital-to-analog conversion, amplification, filtering, and frequency upconversion or performs these processes reversely. The display module 1040 is connected to the processor 1010 and displays various types of information. The display module 1040 may be configured as, not limited to, a known component such as a liquid crystal display (LCD), a light emitting diode (LED) display, and an organic light emitting diode (OLED) display. The UI module 1050 is connected to the processor 1010 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'access point (AP)', etc.

The embodiments of the present invention may be achieved by various means, for example, hardware, firmware, software, or a combination thereof. In a hardware configuration, the methods according to exemplary embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method and apparatus for providing control information for MUST transmission in a wireless communication system have been described in the context of a 3GPP LTE system, they are also applicable to various wireless communication systems other than the 3GPP LTE system.

The invention claimed is:

1. A method of receiving a downlink data signal from a base station (BS) by a user equipment (UE) in a wireless communication system, the method comprising:
   receiving downlink control information including an interference signal-related field, wherein the downlink control information is masked by a first UE identifier (ID) indicating absence of an interference signal or one of second UE IDs indicating presence of the interference signal; and
   receiving the downlink data signal by using the downlink control information, wherein, based on the downlink control information being masked by the first UE ID, the downlink data signal is received on the assumption that the interference signal does not exist, wherein, based on the downlink control information being masked by the one of the second UE IDs, the downlink data signal is received with canceling the interference signal using the one of the second UE IDs, and wherein each of the second UE IDs indicates the modulation scheme applied to the interference signal.

2. The method according to claim 1, wherein each of the second UE IDs indicate whether a modulation order of the modulation scheme applied to the interference signal is equal to or larger than a specific value.

3. The method according to claim 1, wherein each of the second UE IDs indicate one of quadrature phase shift keying (QPSK), 16-ary quadrature amplitude modulation (16QAM), and 64-ary quadrature amplitude modulation (64QAM) as the modulation scheme applied to the interference signal.

4. The method according to claim 1, wherein the interference signal is a downlink data signal for another UE, multiplexed with the downlink data signal.

5. The method according to claim 4, wherein the other UE is a far UE located at a coverage boundary of the BS.

6. A user equipment (UE) in a wireless communication system, the UE comprising:
a wireless communication module; and
a processor connected to the wireless communication module, and configured to:
receive downlink control information including an interference signal-related field, wherein the downlink control information is masked by a first UE identifier (ID) indicating absence of an interference signal or one of second UE IDs indicating presence of the interference signal, and receive a downlink data signal by using the downlink control information, wherein, based on the downlink control information being masked by the first UE ID, the downlink data signal is received on the assumption that the interference signal does not exist, wherein, based on the downlink control information being masked by the one of the second UE IDs, the downlink data signal is received with canceling the interference signal using the one of the second UE IDs, and wherein each of the second UE IDs indicates the modulation scheme applied to the interference signal.

7. The UE according to claim 6, wherein each of the second UE IDs indicate whether a modulation order of the modulation scheme applied to the interference signal is equal to or larger than a specific value.

8. The UE according to claim 6, wherein each of the second UE IDs indicate one of quadrature phase shift keying (QPSK), 16-ary quadrature amplitude modulation (16QAM), and 64-ary quadrature amplitude modulation (64QAM) as the modulation scheme applied to the interference signal.

9. The UE according to claim 6, wherein the interference signal is a downlink data signal for another UE, multiplexed with the downlink data signal.

10. The UE according to claim 9, wherein the other UE is a far UE located at a coverage boundary of a base station (BS).

* * * * *